March 15, 1927.
L. L. LOMAR
SHOCK ABSORBER
Filed Nov. 11, 1925  2 Sheets-Sheet 1
1,621,261
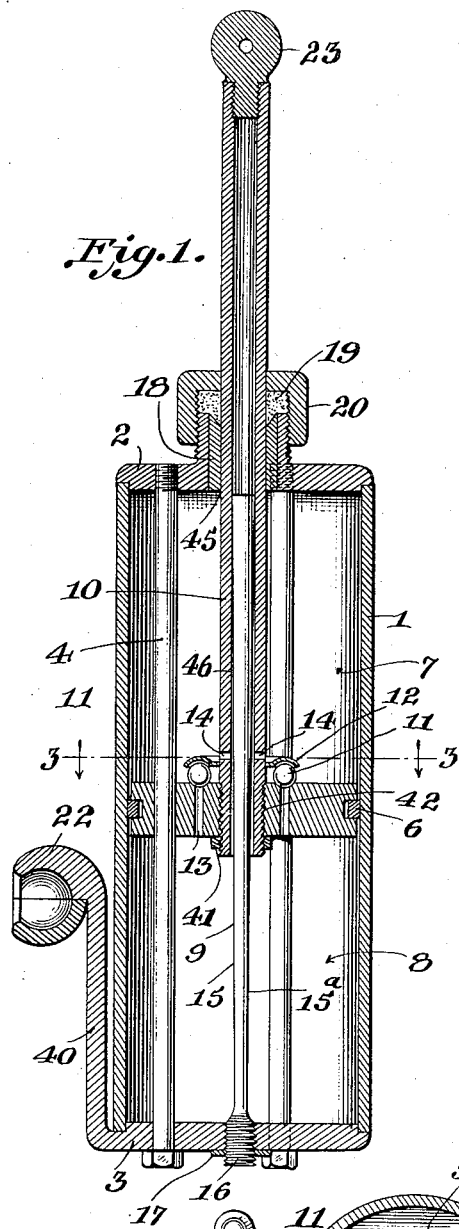
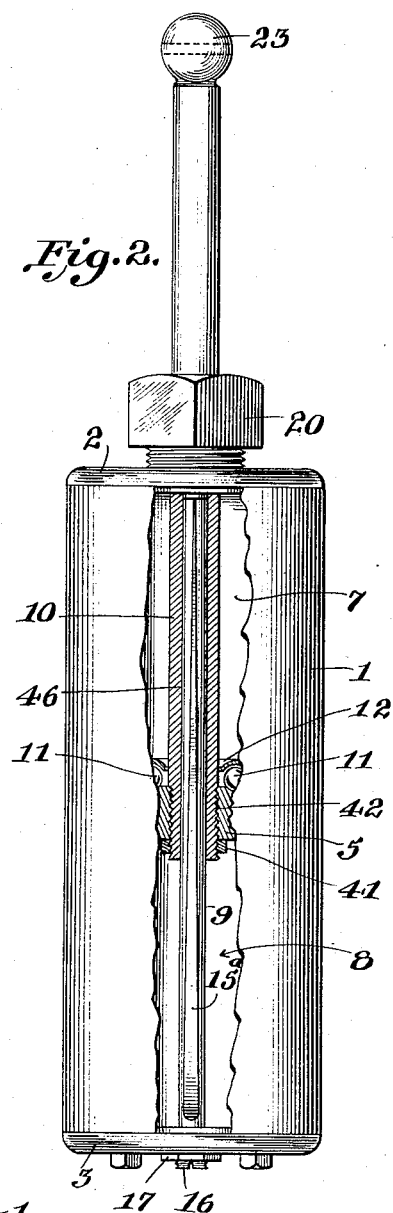
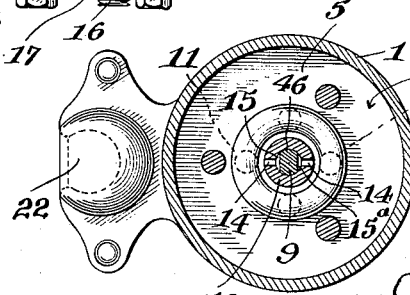
Inventor
Louis L. Lomar
By J. W. Milburn
Attorney March 15, 1927.
L. L. LOMAR
SHOCK ABSORBER
Filed Nov. 11, 1925
1,621,261
2 Sheets-Sheet 2
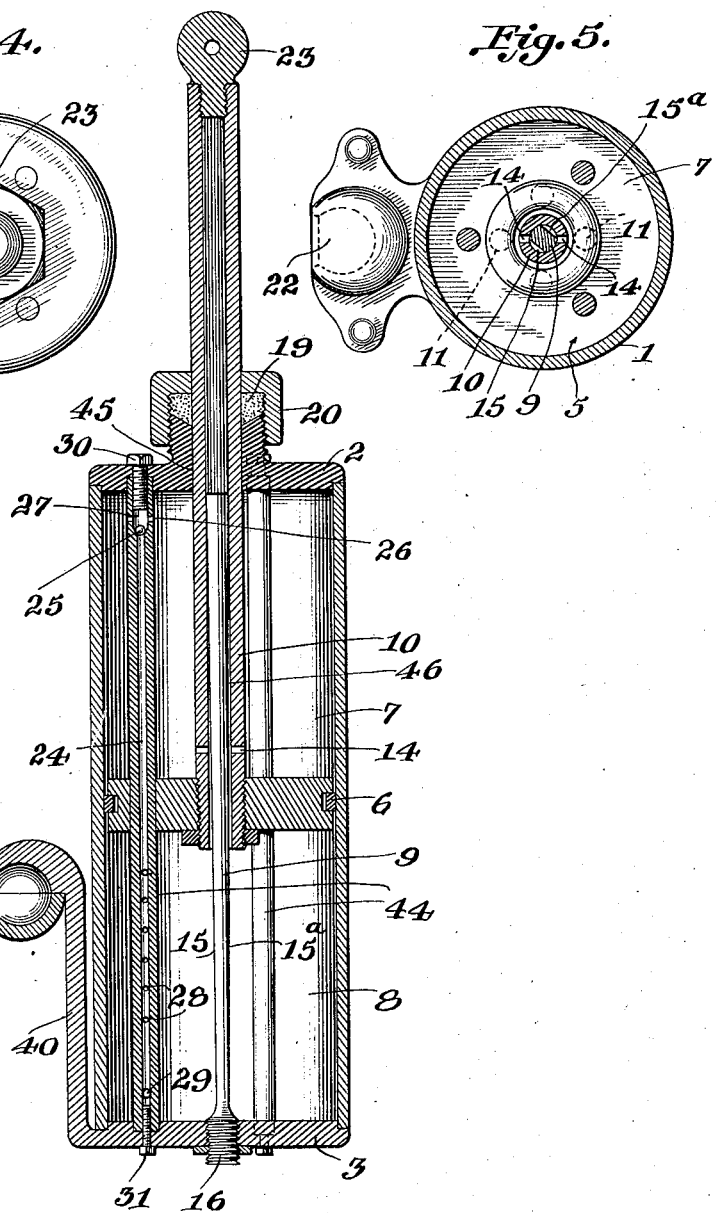
Inventor
Louis L. Lomar
By J. W. Milburn
Attorney

Patented Mar. 15, 1927.

1,621,261

UNITED STATES PATENT OFFICE.

LOUIS L. LOMAR, OF HOUSTON, TEXAS.

SHOCK ABSORBER.

Application filed November 11, 1925. Serial No. 68,420.

My invention relates to shock absorbers adapted for use on automobiles and similar structures and particularly to shock absorbers of the type in which a piston moves within a fluid containing cylinder.

In devices of this character it is usual to provide for escape of a portion of the fluid subjected to compressive action of the piston from one side of the piston to the other. This is ordinarily by means of valved or otherwise restricted passages through or around the piston.

In certain of the well-known constructions an aperture is formed in the piston and in some instances a valve controls the passage of fluid through such aperture. Different types and arrangements of valves have been employed in an effort to regulate the flow of liquid in such manner as will adequately and properly cushion the stroke of the piston in one or both directions.

Considerable difficulty has been experienced in determining the proper location and size of the fluid passages and in devising regulating means which will be adequate and effective under all conditions. The devices heretofore employed have been open to the objection that they were difficult and expensive to manufacture or that they were incapable of properly regulating the flow of fluid or could not be readily adjusted to accommodate varying operating conditions, with different cars, different loads, and other varying factors.

The principal object of my invention is to provide a shock absorber of this general type with efficient means controlled by movement of the piston for regulating the speed of movement of the piston and cushioning its action.

Another object of my invention is a shock absorber of the piston type which is simple in construction and comparatively easy to manufacture and which may be readily adjusted for different operating conditions while the device is in position upon an automobile.

Still further objects are the provision of means for properly controlling and regulating the action of the shock absorber during the shock and the rebound, and of readily accessible means for adjusting the device to accommodate varying conditions.

Figure 1 of the drawings is a vertical section through the shock absorber.

Figure 2 is a view, partly in section, taken at right angles to the view shown in Figure 1.

Figure 3 is a section taken on the line 3—3 of Figure 1.

Figure 4 is a top view of the shock absorber.

Figure 5 is a view similar to that shown in Figure 3, but with the valve shown in slightly different position, and Figure 6 is a vertical section of a modified form of my invention.

The device which constitutes my present invention comprises a cylindrical casing 1, closed at its respective ends by caps 2 and 3, and adapted to contain oil or other fluid, a piston 5, within the casing, and a hollow piston rod 10, slidable through an opening 45 in cap 2. Escape of fluid through this opening is prevented by the usual bushing 18, packing 19, and packing nut 20.

The casing 1 and the hollow piston rod 10 are adapted to be secured to relatively movable parts of a vehicle. In the preferred adaptation of my device the casing is provided with a bracket 40 which may be made integral with the cap 3, and which carries a socket member 22 of a ball and socket joint by means of which the casing may be attached to the axle of the vehicle. The piston rod 10 may be connected by a similar universal joint to the frame of the vehicle, a suitable ball member 23 being fitted upon the end of the piston rod for this purpose.

In the form of my device shown in Figures 1 to 5, inclusive, the casing 1 and its caps 2 and 3 are held tightly together by screws 4 which pass through apertures in the piston 5 and serve to guide the piston in its movement and prevent it from turning.

The piston 5 divides the interior of the casing 1 into chambers 7 and 8. Passage of fluid past this piston from one chamber to the other is prevented by a packing ring 6. The inner end of the piston rod 10 is screw-threaded, as at 42, and extends through a central opening in the piston 5 and is secured thereto by a nut 41. By means of apertures 14 formed in the walls of the piston rod 10 and communicating with its central bore 46, restricted passage for fluid is provided between fluid chambers 7 and 8. The flow of fluid through these openings 14 is controlled by a valve 9 mounted upon cap 3 and having its free end projecting within the bore 46 of hollow piston rod 10. Valve 9 is flattened and tapered, as at 15 and 15ª, the width of each flat portion tapering from the base of the valve to its free end (see Figures 1 and 2). The valve or valve rod 9 is so supported as to be adjustable from the exterior of the casing, its screw-threaded head 16 being screwed into a screw socket in cap 3 and held in adjusted position by a locknut 17. The valve 9 may be adjusted by turning screw head 16, and thus varying the angular position of the faces 15 and 15ª relative to the openings 14. The valve 9 is shown in fully open position in Figure 3 and in partially closed position in Figure 5.

Increased flow of fluid through the piston in one direction is provided for by passages 13, controlled by ball check valves 11, retained in alignment with said openings by a collar 12 on piston rod 10.

In the operation of the device shown in Figures 1 to 5, inclusive, when the vehicle wheels strike an obstruction or elevation in the road, the vehicle frame descends, carrying with it piston rod 10 and moving piston 5 downwardly toward cap 3. Downward movement of the piston is retarded by the liquid in chamber 8, which is gradually forced into chamber 7, principally through openings 13. On the rebound from the compression of the vehicle spring, piston 5 is drawn upwardly against the resistance of the body of fluid in chamber 8. In this direction of movement of the piston the openings 13 are closed by valves 11, and fluid can pass from chamber 7 to chamber 8 only through openings 14 and bore 46. This restricted passage retards the upward movement of the piston. The passage of fluid through openings 14 will be further retarded by valve 9 and, by reason of the tapered form of this valve, the retarding action will gradually increase as the piston moves toward cap 2 and the larger or free end of the valve or valve rod 9. In this way the rebound action is gradually checked. Where conditions are such as to make it desirable to vary the degree of checking action, the flow of fluid through openings 14 may be regulated by turning the screw head 16 of the valve in either direction, to control the flow through the openings 14, the retarding action being greater when the valve is in a position partially closing openings 14 (as in Figure 5) than when it is in fully open position (as in Figure 3). Thus, the vehicle spring is under definite control at all times, and this control may be regulated and altered to accord with varying conditions by means of an exterior adjustment of the control valve 9, without dismantling the device or removing any part of it from the vehicle.

In the modified form of the device illustrated in Figure 6, the construction and arrangement of the casing, piston, and piston rod and adjustable tapered valve are the same as in the form shown in Figures 1 to 5, inclusive.

In the Figure 6 device, however, the guide members 44 are tubular, and provided with a series of openings 28 so placed that they will be covered or uncovered seriatim by the piston during a portion of its movement. The interior of the tubes 44 is also in communication with chambers 7 and 8 through openings 29 and 26, each of which is preferably of greater size than any of the openings 28. Passage of fluid through the conduits 24 of the tubes 44 is controlled by check valves 25 in valve chambers 27. Screws 30 and 31 extend through casing caps 2 and 3, respectively, and engage the threaded end portions of guide members 44 to retain the latter in position and clamp the caps 2 and 3 upon the casing 1. Screws 30 also serve to close the chambers 27 and retain the valves 25.

The operation of the Figure 6 form of my device is generally similar to that of the Figure 1 form. On the downward stroke of the piston 5, liquid is forced from chamber 8 through openings 28, conduit 24 and openings 26 into chamber 7. Some liquid may also pass out of the chamber through bore 46 and openings 14. In the course of the downward stroke of the piston it first closes the uppermost of the openings 28, compelling the liquid to flow through the openings remaining uncovered. As the piston continues downwardly, the other openings 28 are successively covered. In this way the flow of liquid from chamber 8 is gradually decreased and the resistance to downward movement of the piston is correspondingly increased, with the result that the shock which impels the piston downwardly is gradually checked.

Upon the rebound, the piston 5 moves upwardly, exerting an upward pressure upon the liquid in chamber 7 and closing check valve 25. Since the liquid in chamber 7 cannot then pass through conduit 24, its escape is limited to the restricted passage through openings 14 and the valve-controlled end of bore 46. This insures a comparatively slow and substantially uniform upward movement of the piston and a corresponding control or dampening of the rebound.

I claim:—

1. In a device of the character described, a casing adapted to contain a fluid, a piston within said casing, a hollow piston rod open at its inner end and extending through the piston, said piston rod having an aperture in its wall, a tapered valve rod adjustably mounted within said casing and extending within said hollow piston rod, said valve rod having a portion of its surface flattened to provide for regulation of the passage of fluid through said opening, said casing and said piston rod being adapted to be connected to relatively movable parts of a vehicle.

2. In a device of the character described, a casing adapted to contain a fluid, a piston within said casing, a hollow piston rod open at its inner end and extending through said piston, said piston rod having an aperture in its wall, a tapered valve within said casing for controlling the passage of fluid through said aperture, one end of said rod extending through an opening in said casing and axially adjustable therein from the exterior of said casing, the other end of said valve rod extending within said hollow piston rod and having a portion of its surface cut away to provide for regulation of the passage of fluid through said aperture, said piston rod and said casing being adapted to be connected to relatively movable parts of a vehicle.

3. In a device of the character described, a casing adapted to contain a fluid, a piston within said casing, a hollow piston rod open at its inner end extending through said piston and provided with an opening on the opposite side of said piston, a tapered valve adjustably mounted within said casing and extending within said hollow piston rod, said valve having a portion of its surface flattened to provide for regulation of the passage of fluid through said opening, and guide rods secured within said casing and extending through suitable openings in said piston, there being a second passage for fluid from one side of the piston to the other and a check valve controlling said passage, said casing and said piston rod being adapted to be connected to relatively movable parts of a vehicle.

4. In a device of the character described, a casing adapted to contain a fluid, a piston within said casing, a hollow piston rod open at its inner end and extending through said piston, said piston rod having an aperture in its wall, a tapered valve adjustably mounted within said casing and extending within said hollow piston rod, said valve having a longitudinally tapered flat face to provide for regulation of the passage of fluid through said aperture, said piston rod and said casing being adapted to be connected to relatively movable parts of a vehicle.

5. In a device of the character described, a casing adapted to contain a fluid, a piston within said casing, a hollow piston rod open at its inner end and extending through said piston, said piston rod having oppositely disposed apertures in its wall, a valve mounted in said casing and axially adjustable therein, said valve extending within said hollow piston rod and having oppositely disposed longitudinally tapered flat faces to provide for regulation of the passage of fluid through said oppositely disposed apertures.

6. In a device of the character described, a casing adapted to contain a fluid, a piston in said casing, a hollow piston rod open at its inner end and provided with an opening on the opposite side of the piston, a tapered valve rod adjustably mounted in said casing and extending within said hollow piston rod, said valve rod having a portion of its surface flattened to provide for regulation of the passage of fluid through said opening, and hollow guide members secured within said casing and extending through suitable openings in said piston, said guide members being provided with openings to permit passage of fluid from one side of the piston to the other through said hollow guide members.

7. In a device of the character described, a casing adapted to contain a fluid, a piston within said casing, means for operating said piston, said means and said casing being adapted to be connected to relatively movable parts of a vehicle, said piston having a passage therethrough, a by-pass conduit in said casing having a series of longitudinally-spaced apertures adapted to be closed seriatim by movement of the piston, and a valve for said passage.

8. In a device of the character described, a casing adapted to contain a fluid, a piston within said casing, a piston rod extending through said casing, hollow guide rods extending through said piston and provided with a series of longitudinally spaced apertures and a larger aperture closer to each of its ends, a check valve controlling one of said larger apertures, said piston and said piston rod being adapted to be connected to relatively movable parts of a vehicle.

9. In a device of the character described, a casing adapted to contain a fluid, said casing comprising an open-ended body portion and caps therefor, a piston within said casing, a hollow piston rod open at its inner end and extending through said piston, said piston rod having an aperture in its wall, a valve adjustably mounted within said casing and extending within said hollow piston rod, said valve having a portion of its surface flattened, said flattened portion tapering longitudinally, hollow guide rods extending through said piston and provided with a series of longitudinally spaced apertures and a larger aperture closer to each of its ends, a check valve controlling one of said larger apertures, and screws extending through said casing caps for securing said guide rods in position and clamping said caps upon said casing.

10. In a device of the character described, a casing adapted to contain a fluid, a piston within said casing, means for operating said piston, said means and said casing being adapted to be connected to relatively movable parts of a vehicle, said piston having a passage therethrough, a valve adapted to respectively open and close said passage gradually as the piston moves in opposite directions, and a by-pass conduit in said casing having an opening at one end thereof and a series of longitudinally-spaced apertures toward the opposite end thereof adapted to be closed seriatim by movement of said piston.

11. In a device of the character described, a casing adapted to contain a fluid, a piston within said casing, means for operating said piston, said means and said casing being adapted to be connected to relatively movable parts of a vehicle, said piston having a passage therethrough, a tapered valve within said casing and extending within said passage to gradually open and close said passage during movement of said piston, a by-pass conduit in said casing having a series of longitudinally-spaced apertures adapted to be closed seriatim by movement of said piston, and a check valve for said conduit.

12. In a device of the character described, a casing adapted to contain a fluid, a piston within said casing, means for operating said piston, said means and said casing being adapted to be connected to relatively movable parts of a vehicle, said piston having a passage therethrough, a valve controlling said passage and arranged to gradually open said passage during movement of the piston in one direction and to gradually close said passage during movement of the piston in the opposite direction, a by-pass conduit in said casing having a series of longitudinally-spaced apertures adapted to be covered seriatim by movement of said piston during its movement in the direction in which the passage through the piston is being opened, and a check valve for closing said conduit when the piston moves in the opposite direction.

13. In a device of the character described, a casing adapted to contain a fluid, a piston within said casing, means for operating said piston, said means and said casing being adapted to be connected to relatively movable parts of a vehicle, said piston having a passage therethrough, a valve for said passage, a tubular member extending through said piston and provided with an opening communicating with the interior of said casing at each end thereof and a series of longitudinally-spaced apertures between said openings, said apertures being adapted to be covered and uncovered seriatim by said piston to afford a varying resistance to movement of said piston during a portion of its stroke.

LOUIS L. LOMAR.